United States Patent [19]

Karol et al.

[11] Patent Number: 5,362,823
[45] Date of Patent: Nov. 8, 1994

[54] CATALYST SYSTEM CONTAINING AN AUTOACCELERATION INHIBITOR

[75] Inventors: Frederick J. Karol, Belle Meade; Kao Sun-Chueh, Piscataway; James S. Drage, Edison, all of N.J.

[73] Assignee: Union Carbide Chemicals & Plastics Technology Corporation, Danbury, Conn.

[21] Appl. No.: 488,899

[22] Filed: Mar. 6, 1990

Related U.S. Application Data

[62] Division of Ser. No. 349,398, May 8, 1989, Pat. No. 4,942,147.

[51] Int. Cl.$^5$ .................. C08F 4/60; C07C 45/00; C07C 5/00; C07C 2/02
[52] U.S. Cl. .................. 526/114; 526/115; 526/116; 526/119; 526/129; 526/140; 526/142; 526/159; 526/903; 568/451; 585/250; 585/511; 585/523
[58] Field of Search ............. 526/119, 114, 115, 116, 526/129, 159, 140, 142; 568/451; 585/250, 511, 523

[56] References Cited

U.S. PATENT DOCUMENTS

| | | | |
|---|---|---|---|
| 2,883,372 | 4/1959 | Stamatoff | 526/283 |
| 3,211,709 | 10/1965 | Odamek et al. | 526/283 |
| 3,577,393 | 5/1971 | Schrage et al. | 526/903 |
| 3,714,133 | 1/1973 | Kawasaki et al. | 526/119 |
| 4,368,302 | 1/1983 | Downs | 526/903 |
| 4,988,783 | 1/1991 | Beran et al. | 526/129 |

*Primary Examiner*—Edward J. Smith
*Attorney, Agent, or Firm*—Saul R. Bresch

[57] ABSTRACT

In a transition metal catalyst system, the improvement comprising including in the catalyst system an autoacceleration inhibitor, which (i) at about the temperature at which the catalyst system autoaccelerates, decomposes into a poison for the catalyst system; (ii) is present in the catalyst system in an amount sufficient to provide the quantity of poison required to inhibit the autoacceleration of the catalyst system at the autoacceleration temperature; and (iii) is either essentially inert at the normal operating temperature of the catalyst system or will cause substantially less inhibition of the catalyst system at the normal operating temperature than at the autoacceleration temperature.

6 Claims, No Drawings

CATALYST SYSTEM CONTAINING AN AUTOACCELERATION INHIBITOR

This application is a division of prior U.S. application Ser. No. 349,398, Filing Date, May 8, 1989, now U.S. Pat. No. 4,942,147.

TECHNICAL FIELD

This invention relates to a catalyst system containing an autoacceleration inhibitor.

BACKGROUND ART

Paradoxically, the high activity at elevated temperatures, which makes many transition metal catalyst systems so attractive, is also responsible for a negative characteristic. This deficiency exhibits itself in the form of a kinetic profile, which can be described as "autoacceleration", and leads to processes, which are, in effect, out of control; processes in which the reactants are "over-reactive"; agglomeration of particulate product; and other various undesirable results such as hot-spotting, chunking, and sheeting.

Autoacceleration can be defined as an abrupt increase in the reaction rate of a process to an undesirable level due to a sudden rise in temperature. In effect, the system is unable to remove the heat as fast as it is generated. Control of this behavior is essential for the smooth operation of the process in the reactor. The usual response to a reactor upset caused by autoacceleration is to have the operator initiate a reactor kill by the rapid injection of a catalyst poison. The initiation of such a drastic measure is made at the discretion of the operator, and depends entirely on his judgment as to the performance of the catalyst in the reactor.

To relieve the operator of the responsibility for making this decision, which, at least in part, tends to be subjective, in-situ control of catalyst kinetics has been suggested, the goal being to let the catalyst monitor its own behavior.

DISCLOSURE OF THE INVENTION

An object of the invention, therefore, is to provide a catalyst system, which will, in-situ, essentially avoid autoacceleration. Other objects and advantages will become apparent hereinafter.

According to the present invention, an improvement in a transition metal catalyst system has been discovered, which meets the above objective. The improvement comprises including in the catalyst system an autoacceleration inhibitor, which (i) in the temperature range at which the catalyst system autoaccelerates, decomposes into a poison for the catalyst system; (ii) is present in the catalyst system in an amount sufficient to provide the quantity of poison required to inhibit the catalyst system in the autoacceleration temperature range; and (iii) is either essentially inert in the normal operating temperature range of the catalyst system or will cause substantially less inhibition of the catalyst system in the normal operating temperature range than in the autoacceleration temperature range.

DETAILED DESCRIPTION

Subject invention is considered to be universal in that the autoacceleration inhibitor can be used advantageously in any transition metal catalyst system employed in a process in which autoacceleration is a potential problem.

Examples of various catalyst systems and autoacceleration inhibitors therefor are set forth in Table I. It will be understood that autoacceleration and decomposition temperature ranges vary from system to system and inhibitor to inhibitor. Those mentioned in Table I provide some guidance for the particular catalyst systems mentioned.

TABLE I

| Catalyst System | Process In Which The Catalyst System Is Utilized | Autoacceleration Temperature (°C.) | Autoacceleration Inhibitor | Decomposition Temperature of Autoacceleration Inhibitor (°C.) |
|---|---|---|---|---|
| 1. e.g., $VCl_3/AlR_3$ and $TiCl_3/MgCl_2/AlR_3$ | Olefin Polymerization, e.g., See U.S. Pat. Nos. 4,302,566 and 4,508,842 | About 110 to 125 | Metal Carbonyls, Dicyclopentadiene, Sulfones | About 110 to 130 |
| 2. $(R_3P)_2Rh(H)(CO)$ (supported liquid phase catalyst) | Olefin Hydroformylation, e.g., see U.S. Pat. No. 3,487,112. Also see J. Mol. Catal. 1985 vol. 31, page 107. | >100 | Dicyclopentadiene, Sulfones | 100 to 130 |
| 3. Ni Catalysts, i.e., 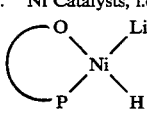 | Olefin Oligomerization, e.g., see U.S. Pat. No. 4,689,437 | About 100 | Dicyclopentadiene, Sulfones | 100 to 130 |
| 4. $Pd/Al_2O_3$ | Hydrogenation of Polyenes | >150 | 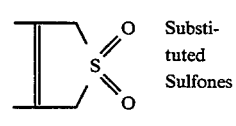 Substituted Sulfones; metal carbonyls | >150 |
| 5. $PdCl_2/CuCl_2$ | Wacker Process (Olefins to aldehydes and ketones) | >130 | 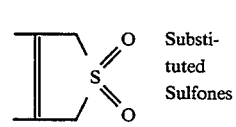 Substituted Sulfones; metal carbonyls | >130 |

The invention will be discussed in terms of a typical catalyst system useful in the polymerization of alphaolefins, particularly for the production of homopolymers and copolymers of ethylene, i.e., a vanadium catalyst system comprising:

(i) the reaction product of a vanadium compound and an electron donor, which is a liquid organic Lewis base in which the vanadium compound is soluble;

(ii) a silica support into which component (i) is impregnated;

(iii) a halocarbon promoter;

(iv) a hydrocarbyl aluminum cocatalyst and (v) as an autoacceleration inhibitor, a Dieis-Alder adduct or a transition metal carbonyl, with the proviso that the inhibitor is such that it will decompose when the catalyst system reaches its autoacceleration temperature range.

It will be understood that some inhibitors will be essentially inert in the normal operating temperature range while others will decompose in the normal operating temperature range, but will cause substantially less inhibition of the catalyst system in the normal operating temperature range than in the autoacceleration temperature range.

The vanadium compound can be any one of the well known group of vanadium compounds used to form those complexes, which find use as catalyst precursors in polymerization processes. Examples are vanadium trihalides, vanadium tetrahalides, and vanadium oxyhalides. The halides are generally chlorides, bromides, or iodides, or mixtures thereof. Of these compounds $VCl_3$, $VCl_4$, and $VOCl_3$ can be mentioned. The vanadium acetylacetonates such as vanadyl triacetylacetonate are also useful.

The electron donor is a liquid, organic Lewis base in which the vanadium compound is soluble. It can be selected from the group consisting of alkyl esters of aliphatic and aromatic carboxylic acids, aliphatic ketones, aliphatic amines, aliphatic alcohols, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

The silica support is a solid, particulate porous material essentially inert to the polymerization. It is used as a dry powder having an average particle size of about 10 to about 250 microns and preferably about 30 to about 100 microns; a surface area of at least about 3 square meters per gram and preferably about 50 square meters per gram; and a pore size of at least about 80 angstroms and preferably at least about 100 angstroms. Generally, the amount of support used is that which will provide about 0.05 to about 0.6 millimole of vanadium compound per gram of support and preferably about 0.3 to about 0.5 millimole of vanadium compound per gram of support.

The halocarbon promoter can have the following formula:

$$R_aCX_{(4-a)}$$

wherein

R = hydrogen or an unsubstituted or halogen substituted alkyl radical having 1 to 6 carbon atoms;

X = a halogen; and a = 0, 1, or 2.

The halogen can be chlorine, bromine, iodine, or fluorine, and each X can be alike or different. Preferred promoters include fluoro-, chloro-, and bromo-substituted methane or ethane having at least 2 halogen atoms attached to a carbon atom, e.g., chloroform, $CFCl_3$, $CH_3CCl_3$, carbon tetrachloride, and $CF_2ClCCl_3$. The first three mentioned promoters are preferred. About 0.1 to about 10 moles, and preferably about 0.2 to about 2 moles, of promoter can be used per mole of cocatalyst.

The hydrocarbyl aluminum cocatalyst can be represented by the formula $R_3Al$ wherein each R is an alkyl radical; each R can be alike or different; and each R has 1 to 14 carbon atoms, and preferably 2 to 8 carbon atoms. Further, each alkyl radical can be a straight or branched chain. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimehhylhexyl, nonyl, decyl, isodecyl, undecyl, and dodecyl.

Examples of suitable hydrocarbyl aluminum compounds are as follows: triisobutylaluminum, trihexylaluminum, di-isobutylhexylaluminum, isobutyl dihexylaluminum, trimethylaluminum, triethylaluminum, hripropylaluminum, triisopropylaluminum, tri-n-butylaluminum, trioctyaluminum, tridecylaluminum, tridodecylaluminum, tribenzylaluminum, triphenylaluminum, trinaphthylaluminum, and tritolylaluminum. The preferred hydrocarbyl aluminums, are triethylaluminum, triisobutylaluminum, and trihexylaluminum.

The cocatalyst and promoter can be added to the supported vanadium complex either before or during the polymerization reaction. They can be added together or separately, simultaneously or sequentially. The cocatalyst and promoter are preferably added separately as solutions in an inert solvent, such as isopentane, to the polymerization reaction at the same time as the flow of the ethylene is initiated. The cocatalyst is necessary to obtain any significant polymerization. The promoter, on the other hand, can be considered a preferred option. About 5 to about 500 moles, and preferably about 10 to about 40 moles, of cocatalyst can be used per mole of vanadium catalyst, i.e., the reaction product of the vanadium compound and the electron donor.

The autoacceleration inhibitor can be a Dieis-Alder adduct or a transition metal carbonyl with the proviso that the inhibitor is such that it will decompose when the catalyst reaches the autoacceleration temperature range. It is believed that the decomposition product then reacts with the active sites on the catalyst to prevent autoacceleration from occurring. The inhibitor is preferably stable until it reaches the decomposition temperature range. The autoacceleration temperature range, e.g., for a high density polyethylene vanadium catalyst system is in the range of about 110 to about 125° C. The decomposition temperature range of the autoacceleration inhibitor, then, preferably begins at the lower end of this range. While the inhibitor can be either dry mixed with the catalyst or added to the reactor as a separate component, it preferably resides in the catalyst particles, e.g., the inhibitor is impregnated into a silica support along with the catalyst precursor.

Dieis-Alder adducts are described in Streitwieser et al, *Introduction to Organic Chemistry*, 3rd edition, Macmillan, New York, 1985, pages 550 to 558. Those which are useful as autoacceleration inhibitors, in accordance with this invention, can have about 4 to about 20 carbon atoms and preferably have about 4 to about 10 carbon atoms. They can have one or two carbon to carbon unsaturated bonds and be either monocyclic or polycyclic. Further, they can be substituted or unsubstituted hydrocarbon compounds. Examples of suitable substituents are methyl, ethyl, n-propyl, isopropyl, n-butyl, isobutyl, sec-butyl, tert-butyl, n-pentyl, -2-pentyl, -3-pentyl, neopentyl, n-hexyl, 2-hexyl and phenyl; examples of dienes, which can be used to make the adducts, are 1,3-butadiene, 1,3-pentadiene, 2-methyl-1,3-butadiene (isoprene) 1,3-hexadiene, 2,4-hexadiene, 2,3-dimethyl-1,3butadiene, 2,4-dimethyl-1,3-hexadiene, 2,5-dimethyl-2,4-hexadiene, cyclopentadiene, methylcyclopentadiene, 1,3-cyclohexadiene, 1,3-cycloheptadiene, and 1,3-cyclooctadiene; and examples of monoenes or dienophiles, which can be used to make the adducts, are sulfur dioxide, carbon monoxide, cyclopentadiene, vinyl acetate, acrylic acid, dimethyl acetylenedicarboxylate, ethylene, methyl vinyl ketone, diethyl acetylenedicarboxylate, acrolein, and methyl acrylate. Examples of useful Dieis-Alder adducts are dicyclopentadiene, methylcyclopentadiene dimer, butadiene sulfone, isoprene sulfone, and vinylene carbonate.

Autoacceleration inhibitor compounds also useful in the practice of this invention are transition metal carbonyls. The metal is generally selected from Groups VIB, VIIB, and VIII of the periodic table. Transition metals of particular interest are chromium, molybdenum, iron, tungsten, ruthenium, osmium, rhenium, and manganese. The transition metal carbonyls can be inorganic or organic compounds. The organic compounds can contain either unsubstituted or substituted aliphatic or aromatic organic groups provided that the substituents are inert to the particular process in which the inhibitor is being used. Preferably, the organic groups are limited to 2 to 20 carbon atoms, e.g., methyl, ethyl, propyl, isopropyl, butyl, isobutyl, pentyl, heptyl, phenyl, or benzyl. Examples of suitable transition metal carbonyl inhibitors are $Cr(CO)_6$; $Mo(CO)_6$; $Fe(CO)_5$; $W(CO)_6$; $C_5H_5Fe(CO)_2I$; $C_7H_8Mo(CO)_3$; $C_6H_5CO_2CH_3Cr(CO)_3$; $C_6H_5NHCH_3Cr(CO)_3$; $Fe_3(CO)_{12}$; $Ru_3(CO)_{12}$; $Os_3(CO)_{12}$; $Re_2(CO)_{10}$; and $Mn_2(CO)_{10}$.

Mixtures of Dieis-Alder adducts and mixtures of transition metal carbonyls can be used as well as mixtures of Dieis-Alder adducts and metal carbonyls.

The autoacceleration inhibitor is preferably used in a molar ratio of inhibitor to transition metal in the transition metal catalyst in the range of about 0.1:1 to about 200:1 and preferably a molar ratio in the range of about 0.5:1 to about 100:1. The inhibitor can be (i) dry mixed with an impregnated silica support; (ii) impregnated from a solution into a silica support, which has been impregnated with a catalyst precursor; (iii) slurried in an electron donor or other inert solvent with silica prior to the addition of the reaction product of vanadium trihalide and the same electron donor; or added to the reactor separately. In all cases, the silica is preactivated by dehydrating with heat. Any of these routes is more effective than dry mixing the inhibitor with the silica supported vanadium catalyst. In any case, the inhibitors used ]n the preparation of subject catalyst should be essentially free of water. The inhibitors can also be chemically anchored to the support, i.e., a chemical bond is formed between the inhibitor and the support as opposed to a physical adsorption of the inhibitor on the surface of the support. In any of these procedures, the decomposition temperature range of the inhibitor should be avoided.

Optionally, a modifier is included in the vanadium catalyst system and is impregnated into the catalyst support. The formula for the modifier is $BX_3$ or $AlR_{(3-a)}X_a$ wherein each R is an alkyl radical having 1 to 14 carbon atoms; X is chlorine, bromine, or iodine; each R and X are alike oz different; and a is 0, 1, or 2. Preferred modifiers include alkylaluminum mono- and di- chlorides wherein each alkyl radical has 1 to 6 carbon atoms, and boron trichloride. A particularly preferred modifier is diethyl aluminum chloride. About 0.1 to about 10 moles, and preferably about 0.2 to about 2.5 moles, of modifier are used per mole of electron donor. When the modifier is used it appears to be part of the vanadium trichloride/electron donor complex.

The ethylene polymerization or copolymerization can be conducted in the gas phase or liquid phase using conventional techniques such as fluidized bed, slurry, or solution processes. Solution and slurry polymerizations are described in Stille, Introduction to Polymer Chemistry, Wiley and Sons, New York, 1962, and fluidized bed processes in U.S. Pat. No. 4,482,687. A continuous, fluidized bed process is preferred. Using this fluidized bed process, the vanadium complex, the cocatalyst, the promoter, the ethylene monomer, and any comonomers are continuously fed into the reactor and polyethylene product is continuously removed. The density of ethylene copolymer produced may be varied over a wide range depending upon the amount of alpha-olefin comonomer added and upon the particular comonomer employed. The greater the mole percent Of alpha-olefin, the lower the density. The alpha-olefin can have 3 to 12 carbon atoms.

The fluidized bed polymerization is conducted at a temperature below the sintering temperature of the product. The normal operating temperature is generally in the range of about 10° C. to about 115° C. Preferred normal operating temperatures will vary depending upon the density desired. High density polyethylenes of greater than about 0.94 grams per cubic centimeter (g/cc) are produced at normal operating temperatures of about 85° C. to about 115° C., and preferably about 90° C. to about 100° C. Low density polyethylenes ranging in density from about 0.91 to about 0.94 g/cc are preferably produced at a normal operating temperature of about 75° C. to about 90° C. Very low density polyethylenes of less than about 0.91 g/cc are preferably produced at a normal operating temperature of about 10° C. to about 80° C. In the case of very low density polyethylenes, it is necessary to dilute the reaction mixture with a large quantity of diluent gas in order to prevent the formation of polymer agglomerates and sustain polymerization on a continuous basis.

The fluidized bed reactor is typically operated at pressures of up to about 1,000, and preferably about 50 to about 350, psig.

A chain transfer agent, such as hydrogen, can be used to terminate the polymer chain. Usually the ratio of hydrogen employed to ethylene will vary between about 0.001 to about 2.0 moles of hydrogen per mole of ethylene.

The autoacceleration inhibitor acts to essentially curb autoacceleration while not interfering with the high activity of the catalyst at normal operating temperatures to any great extent.

The vanadium based catalyst, except for the autoacceleration inhibitor, and its preparation are closely related to the catalyst described in U.S. Pat. No. 4,508,842.

The patents and publications mentioned in this specification are incorporated by reference herein.

The invention is illustrated by the following examples:

EXAMPLES 1 to 21

A supported vanadium based catalyst is typically prepared as follows: silica gel is preactivated at a temperature in the range of about 250° C. to about 800° C. under a dry, inert gas such as nitrogen for about 8 to about 16 hours to give a support essentially free of adsorbed water and containing less than about 0.7 millimole per gram of silica of surface hydroxy groups. The silica is slurried in freshly distilled tetrahydrofuran (THF), under nitrogen. An amount of $VCl_3(THF)_3$ is added to give a loading of about 0.2 to about 0.6 millimole of vanadium per gram of support. The mixture is stirred for about 20 to about 40 minutes, then excess THF is removed. If diethylaluminum chloride (DEAC) modification is desired, the DEAC is added after the excess THF is removed. A solution of inhibitor in hexane is then added with additional stirring, after which the solvent is removed to give a free flowing powder.

In these examples, a $VCl_3(THF)_3$ solution was added to a slurry of preactivated silica in THF and then dried at 45° C. to a free-flowing powder. This is the catalyst precursor. It was then treated with DEAC as described above. The result was a silica-supported $VCl_3(THF)_3(DEAC)_{1.5}$ catalyst. Except for examples 1 and 8, an autoacceleration inhibitor was added by one of three different methods as follows:

A. added as a separated component to the reactor;
B. dry-mixed with the catalyst; or
C. co-impregnated with the catalyst precursor and DEAC into the silica support. This is accomplished by dissolving the inhibitor in hexane or methylene chloride and mixing the catalyst with this solution for 30 minutes. The solvent is then removed to give a free-flowing powder.

The catalyst, the inhibitor (according to methods A, B or C), a triethylaluminum (TEAL) cocatalyst, and a fluorotrichloromethane promoter (except in example 7 where the promoter is 1,1,1-trichloroethane) were added to a reactor containing 600 milliliters of hexane. An amount of catalyst sufficient to give a charge of 0.05 millimole of vanadium was used. Forty equivalents each of cocatalyst and promoter were used per equivalent of vanadium.

Two runs of 30 minutes each were carried out for each example. One run was effected at 85° C., which is within the normal operating range for the catalyst system. In this case, the reactor was initially pressurized with ethylene and one psi of hydrogen for a total pressure of 160 psig. The other run was effected at 125° C., which is within the autoacceleration temperature range for the catalyst system. In this run, the cocatalyst and the ethylene were added when the reactor reaches a temperature of 120° C. The hydrogen was added at Variables and results are set forth in Tables II and III. Notes with respect to the Examples and Tables:

1. THF=tetrahydrofuran
2. DEAC=diethylaluminum chloride
3. Inhibitor=autoacceleration inhibitor
4. Inhibitor/V=mole ratio of inhibitor to vanadium.
5. Method of Incorporation=A, B, or C, as above.
6. The activity of the catalyst was measured in grams of polyethylene per millimole of vanadium per hour per 100 psig of ethylene.
7. % Change=the difference in activity between control examples without inhibitors and examples with inhibitors. Examples 2 to 7 are compared to example 1 and examples 9 to 21 are compared to example 8.
8. Examples 1 to 7 were performed by adding the catalyst, the cocatalyst, the promoter, and the inhibitor (examples 2 to 7) as separate components directly to the reactor. In contrast, examples 8 to 21 were carried out by first mixing together the catalyst, the cocatalyst, the promoter, and the inhibitor (examples 9 to 21) in a small bottle, and then adding the mixture to the reactor.
9. The controls (no inhibitor) differ in that example 1 shows no major activity change in going from 85° C. to 125° C. whereas example 8 shows a nearly two-fold increase in activity from 85° C. to 125° C. This difference in behavior is believed to result from the two different addition methods that were used (see Note 8).

TABLE II

| Example | Inhibitor | Inhibitor/V | Method of Incorporation | Activity 85° C. | Activity 125° C. | % Change 85° C. | % Change 125° C. |
|---|---|---|---|---|---|---|---|
| 1 | — | — | — | 1044 | 1077 | — | — |
| 2 | dicyclopentadiene | 20 | A | 1095 | 751 | +5 | −30 |
| 3 | dicyclopentadiene | 40 | A | 1370 | 453 | +31 | −58 |
| 4 | dicyclopentadiene | 160 | A | 1116 | 270 | +7 | −75 |
| 5 | butadiene sulfone | 5 | B | 578 | 177 | −45 | −84 |
| 6 | isoprene sulfone | 4 | B | 568 | 65 | −46 | −94 |
| 7 | vinylene carbonate | 5 | B | 1470 | 668 | +41 | −38 |

TABLE III

| Example | Inhibitor | Inhibitor/V | Method of Incorporation | Activity 85° C. | Activity 125° C. | % Change 85° C. | % Change 125° C. |
|---|---|---|---|---|---|---|---|
| 8 | — | — | — | 748 | 1473 | — | — |

TABLE III-continued

| Example | Inhibitor | Inhibitor/V | Method of Incorporation | Activity 85° C. | 125° C. | % Change 85° C. | % Change 125° C. |
|---|---|---|---|---|---|---|---|
| 9 | $Cr(CO)_6$ | 1 | A | 739 | 495 | −1 | −66 |
| 10 | $Mo(CO)_6$ | 0.5 | A | 713 | 511 | −5 | −65 |
| 11 | $Mo(CO)_6$ | 1 | A | 956 | 422 | +28 | −71 |
| 12 | $Mo(CO)_6$ | 2 | A | 741 | 328 | −1 | −78 |
| 13 | $Mo(CO)_6$ | 1 | B | 835 | 966 | +12 | −34 |
| 14 | $Mo(CO)_6$ | 1 | C | 910 | 934 | +20 | −37 |
| 15 | $W(CO)_6$ | 1 | A | 677 | 837 | −10 | −43 |
| 16 | $Fe(CO)_5$ | 1 | A | 766 | 405 | +2 | −73 |
| 17 | $C_5H_5Fe(CO)_2I$ | 1 | A | 430 | 417 | −43 | −72 |
| 18 | $C_7H_8Mo(CO)_3$ | 1 | A | 704 | 372 | −6 | −75 |
| 19 | $C_7H_8Mo(CO)_3$ | 1 | C | 733 | 439 | −2 | −70 |
| 20 | $C_6H_5CO_2CH_3Cr(CO)_3$ | 1 | C | 970 | 905 | +30 | −39 |
| 21 | $C_6H_5NHCH_3Cr(CO)_3$ | 1 | C | 780 | 812 | +4 | −45 |

EXAMPLES 22 to 27

The solid catalyst described above was employed together with a cocatalyst (triethylaluminum), a promoter ($CHCl_3$), and an inhibitor (dicyclopentadiene) to copolymerize ethylene and 1-hexene in a fluid bed reactor system similar to that described in U.S. Pat. No. 4,482,687.

In each polymerization, the solid catalyst component was continually fed to the polymerization reactor along with the cocatalyst, the promoter, and the inhibitor.

Hydrogen was added to the reactor as a chain transfer agent to control the molecular weight of the polymer produced. Nitrogen was also used to maintain the total pressure at a set point.

Table IV below sets forth the catalyst composition and the reaction conditions that were employed. Table V presents two control experiments (examples 22 and 23), run without the inhibitor, which show the normal variation of catalyst activity (vanadium in resin, parts per million). Examples 24 to 27 are experiments to ascertain the effect of temperature on catalyst activity in the presence of the inhibitor.

The examples show that the inhibitor has a stabilizing effect within the normal operating range of the catalyst system.

TABLE IV

| Catalyst | Reaction Conditions | |
|---|---|---|
| Support: Silica gel | Temp. (°C.) | 90 to 110 |
| Precursor: $VCl_3$/THF | Total pressure | 315 psia |
| Modifier: DEAC | $C_2H_4$ pressure | 230 psia |
| Modifier/V Molar Ratio: 1.78 | $N_2$ pressure | 80 psia |
| Cocatalyst: TEAL | $H_2$ pressure | 3.7 to 5.8 psia |
| Promoter: $CHCl_3$ | Comonomer | 1-hexene |
| Al/V Molar Ratio: 24 | Comonomer/$C_2H_4$ (molar ratio) | 0.004 to 0.017 |
| Promoter/V Molar Ratio: 24 | $H_2$/$C_2H_4$ (molar ratio) | 0.016 to 0.025 |
| | Residence Time | 4 hr |
| | Inhibitor | Dicyclopentadiene |
| | Inhibitor/V (molar ratio) | 5.0 to 11.0 |

TABLE V

| Example | Dicyclopentadiene/V (molar ratio) | Temp. (°C.) | Vanadium in Resin (ppm) | Comments |
|---|---|---|---|---|
| 22 | 0 | 90 | 7.4 | — |
| 23 | 0 | 105 | 2.5 | — |
| 24 | 8.0 | 90 | 6.5 | More stable operation |
| 25 | 7.8 | 100 | 6.0 | More stable operation |
| 26 | 11.2 | 110 | 6.0 | More stable operation |
| 27 | 5.0 | 110 | 6.9 | More stable operation |

We claim:

1. In a process catalyzed by a transition metal catalyst system, the improvement comprising carrying out the process in the presence of a transition metal catalyst system comprising a transition metal catalyst and an autoacceleration inhibitor wherein the catalyst is particulate and the inhibitor resides in substantially all of the transition metal catalyst particles, said autoacceleration inhibitor (i) at about the temperature at which the catalyst system autoaccelerates, decomposes into a poison for the catalyst system; (ii) is present in the catalyst system in an amount sufficient to provide the quantity of poison required to inhibit the catalyst system at the autoacceleration temperature; and (iii) is essentially inert at the normal operating temperature of the catalyst system or will cause substantially less inhibition of the catalyst system in the normal operating temperature range than in the autoacceleration temperature range.

2. The process defined in claim 1 wherein the autoacceleration inhibitor is essentially inert at the normal operating temperature of the catalyst system.

3. The process defined in claim 1 wherein the inhibitor is a Diels-Alder adduct.

4. The process defined in claim 1 wherein the inhibitor is a transition metal carbonyl.

5. The process defined in claim 4 wherein the transition metal of the inhibitor is selected from Groups VI, VII, and VIII of the periodic table.

6. The process defined in claim 1 wherein the inhibitor is present in a molar ratio of inhibitor to transition metal in the range of about 0.1:1 to about 200:1.

* * * * *